United States Patent [15] 3,688,274
Cormier et al. [45] Aug. 29, 1972

[54] COMMAND RETRY CONTROL BY PERIPHERAL DEVICES

[72] Inventors: Roger L. Cormier, Wappingers Falls, N.Y.; John H. Sorg, Jr., Los Gatos, Calif.; Caryl A. Thorn, Poughkeepsie, N.Y.

[73] Assignee: International Business Machines Corporation, Armonk, N.Y.

[22] Filed: Dec. 23, 1970

[21] Appl. No.: 101,079

[52] U.S. Cl. ....................340/172.5
[51] Int. Cl. ....................G06f 3/04
[58] Field of Search ....................340/172.5

[56] References Cited

UNITED STATES PATENTS

| | | | |
|---|---|---|---|
| 3,564,502 | 2/1971 | Boehner et al. | 340/172.5 |
| 3,564,506 | 2/1971 | Bee et al. | 340/172.5 |
| 3,432,813 | 3/1969 | Annunziata et al. | 340/172.5 |
| 3,411,143 | 11/1968 | Beausoleil et al. | 340/172.5 |

*Primary Examiner*—Paul J. Henon
*Assistant Examiner*—Ronald F. Chapuran
*Attorney*—Hanifin and Jancin and Owen L. Lamb

[57] ABSTRACT

An input/output subsystem in which a peripheral device controller controls the device in response to commands received from an input/output (I/O) channel. A sequence of channel command words (CCWs) are stored in sequential addresses in a main memory. Some CCWs contain commands, other CCWs contain memory addresses for data but no commands. An initial instruction to the channel gives the channel the address where the first CCW is stored in the memory. The location address of the last CCW in the sequence containing a command is retained in a back-up register in the channel. Further CCWs are chained to the CCW containing the command to provide scattered addresses the the memory for the storage of blocks of data. At the completion of the data transfer operation associated with a CCW, the location address of the CCW is incremented by one address to thereby specify the next sequential address and hence, the next CCW. The next CCW contains an address at which further data are to be stored. The occurrence of a signal from the I/O device indicating an error or a non-error condition, either of which conditions require the retrying of the original command, causes the channel to utilize the retained address to fetch the control work containing the command. This provides a way of backing up in the channel program without interrupting the computer to retry the original initializing command even though intervening control words were executed.

8 Claims, 7 Drawing Figures

INVENTORS
ROGER L. CORMIER
JOHN H. SORG JR.
CARYL A. THORN
BY Owen Lamb
ATTORNEY

COMMAND RETRY CONTROL BY PERIPHERAL DEVICES

FIELD OF THE INVENTION

This invention relates to apparatus for executing a series of control words comprising an input/output program for controlling the operation of a peripheral device of a data processing system; and more particularly, to means for retrying the program upon the occurrence of a condition at the I/O device without the need for interrupting the main computer.

DESCRIPTION OF THE PRIOR ART

Input/output devices provide for the communication of data to a data processing system or between data processing systems. Devices are controlled by a control unit which provides the logic necessary to operate and control the I/O device. The control unit responds to commands received from a data channel which controls the flow of information between the I/O devices and the main storage of the data processing system. The channel, in response to an instruction in the main program of the data processing system, fetches and executes a channel program independently of the central processing unit (CPU). The channel program is made up of instructions called channel command words (CCWs). CCWs related to each other are chained together to perform operations with respect to a single control unit in a predetermined sequence. A CCW specifies the command to be executed, the storage area to or from which the data are to be transferred, and a count indicating the number of bytes of information to be transferred. Scatter read and write operations can be handled by chaining CCWs together. This is called data chaining because the CCWs in this chain, except for the first, do not contain new commands but only specify new areas of storage to or from which data are to be transferred.

I/O error recovery is significantly affected when the channel program utilizes data chaining. In prior systems, the main program retried data-chained channel programs only at the beginning of the CCW list and then only when command chaining is not also used. No retry is attempted at all if both command and data chaining are used by the channel program.

For many devices, the recovery from an error encountered during an operation involves simply the re-execution of the last command. On others, some device or media reorientation is required and then re-execution of the last command can be accomplished. Re-execution of a previous command in a chain of commands is not a difficult matter. All that is necessary is that the address of the last CCW executed be decremented to provide the address of the next to the last CCW, i.e., the last command. Even in a channel program using command chaining or transfer-in-channel CCWs, decrementing the current address yields the address of the last CCW executed.

In the absence of data chaining, the last CCW executed also is the CCW which caused the last command to be sent to the control unit and therefore, re-executing the last command means re-executing the last CCW. However, when data chaining is used, the last command may not have been initiated by the last CCW but by some preceding CCW in the chained list of CCWs. Furthermore, since a transfer-in-channel CCW may be used in conjunction with data chaining, it is not always possible to repetitively fetch successively lower locations in main storage to find the CCW which contains the command which caused the data chain. In the past, re-execution relied on the CPU main program storing a restart or check point in the channel program, i.e., the beginning of a channel program.

Such a system is disclosed in U.S. Pat. No. 3,564,502 filed Jan. 15, 1968, Boehner and McGilvray, which issued on Feb. 16, 1971. In that channel retry apparatus, input/output positional information is transmitted to the CPU for later use by the CPU or by I/O error recovery programs for retrying the particular channel command word in execution at the time that the error occurred in the channel. Positional information about the I/O device is chosen in relation to the execution steps in the channel program so that the retry may be made in accordance with the positional information existing at the time of the channel error. This allows the retry of a single erroneously executed channel command word both during a command chaining operation as well as during non-chained command operations. However, this apparatus does not provide for retrying a channel command where there has been intervening data chaining and it also does not provide for the retrying of a channel command upon a condition existing at the I/O device.

SUMMARY OF THE INVENTION

It is an object of the present invention to provide an improved means for retrying channel commands without interrupting the CPU program.

It is a further object of the present invention to provide an improved control apparatus for peripheral devices to initiate the re-execution of a channel command word upon the occurrence of some retryable condition at the peripheral device or control unit.

It is also an object of the invention to provide an improved peripheral control apparatus which eliminates the need for an I/O interruption and the execution of an error recovery program when a certain class of input/output errors occur.

A further object of the invention is to provide a means responsive to a unique status from a peripheral device to cause an input/output channel to back up in the execution of a channel program and re-execute part of the program in response to a condition signalled by the I/O device.

A further object of the invention is to provide a method and means for allowing the retrying of a command currently executed by a channel, control unit and device without requiring an I/O interruption, recovery program or the re-issuance of a start I/O instruction, in both error as well as non-error situations.

A further object of the invention is to provide means at the control unit and/or device to initiate, over a standard input/output interface, the reissuance of a previous command which the control unit desires to have retried.

Briefly, the above objects are accomplished in accordance with the invention by providing means at a controlling device such as a data channel for retaining the address of a first channel command word (CCW) of a series of chained CCWs controlling data transfer, said first CCW containing the command currently being executed. Means are provided at the control unit in response to an error or non-error condition for presenting status information to the channel which causes the channel to retry the command upon the occurrence of the status condition.

The invention has the advantage that the control unit and device can initiate, over the standard I/O interface, the reissuance of a previous command without the necessity of a input/output interruption.

Furthermore, the invention has the advantage that the retry mechanism is completely transparent to the operating system, and therefore, can provide an automatic means for error recovery resulting in a more reliable system.

A further advantage of the invention is that retry may be utilized in some control units for purposes which are unrelated to errors to thereby enhance the performance of the control unit and the device by allowing the control unit to request the re-execution of a command if for some reason the control unit cannot immediately respond to the command.

The invention has the further advantage that certain commands, command chains, or command sequences may be made selectively retryable by means of a new command defined for the control unit and issued by the channel. Such commands are dependent upon the design of the particular control unit and allow for the retry condition to be initiated not only at the control unit but at the channel.

Furthermore, by adding a unique flag bit in the CCW, the channel program may selectively inhibit or permit devices to initiate command retry. With this mechanism, diagnostic error routines may be performed.

These and other objects, advantages and features of the present invention will become more readily apparent from the following specification when taken in conjunction with the drawings.

GENERAL DESCRIPTION

The present invention is described with respect to a data processing system which operates in accordance with the description found in IBM System/360 Principles of Operation, IBM Systems Reference Library, Form Number A22-6821-5.

Figure 1A:
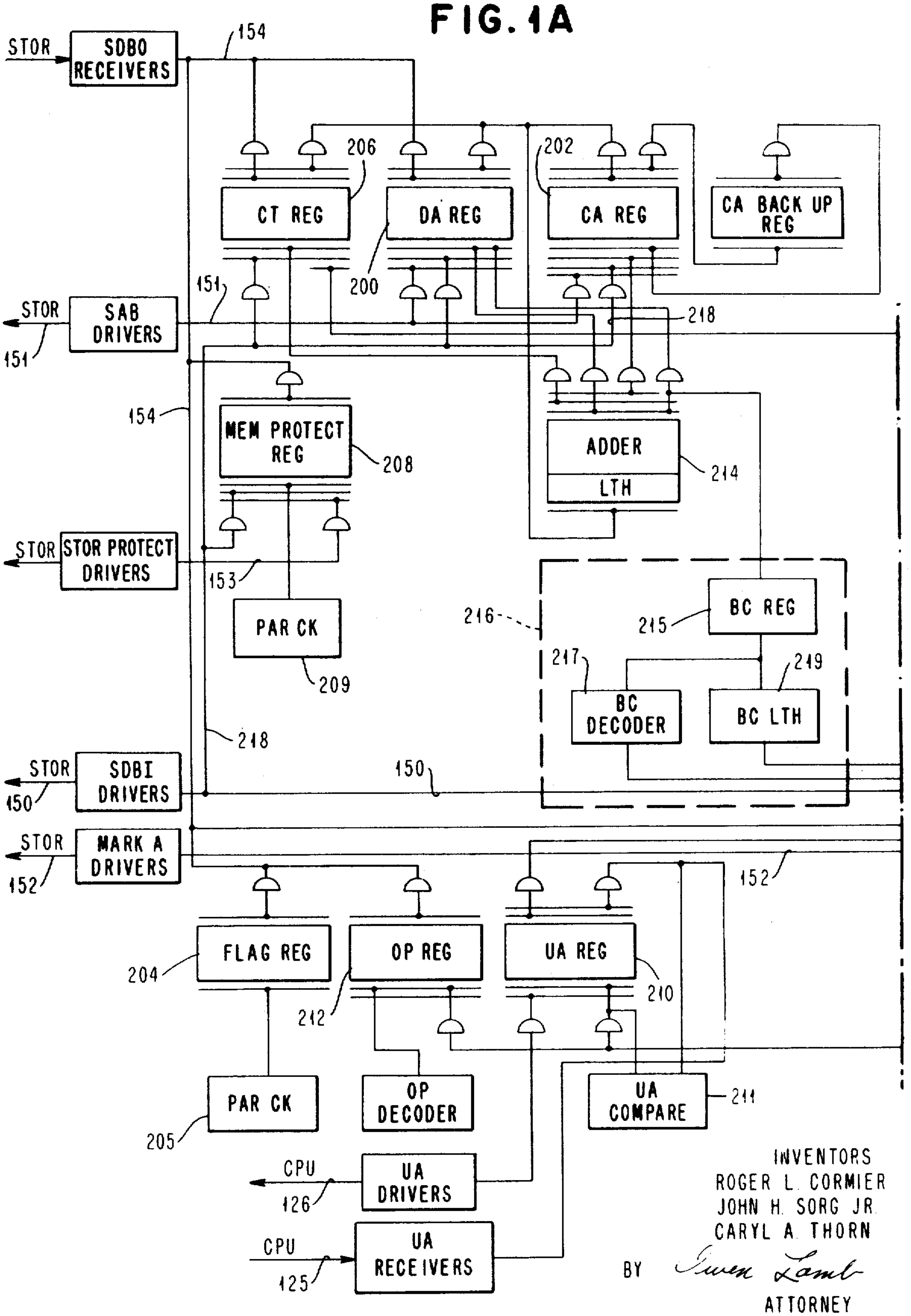
FIGS. 1A and 1B are a schematic diagram of a channel apparatus in which the invention is embodied.
Figure 1B:
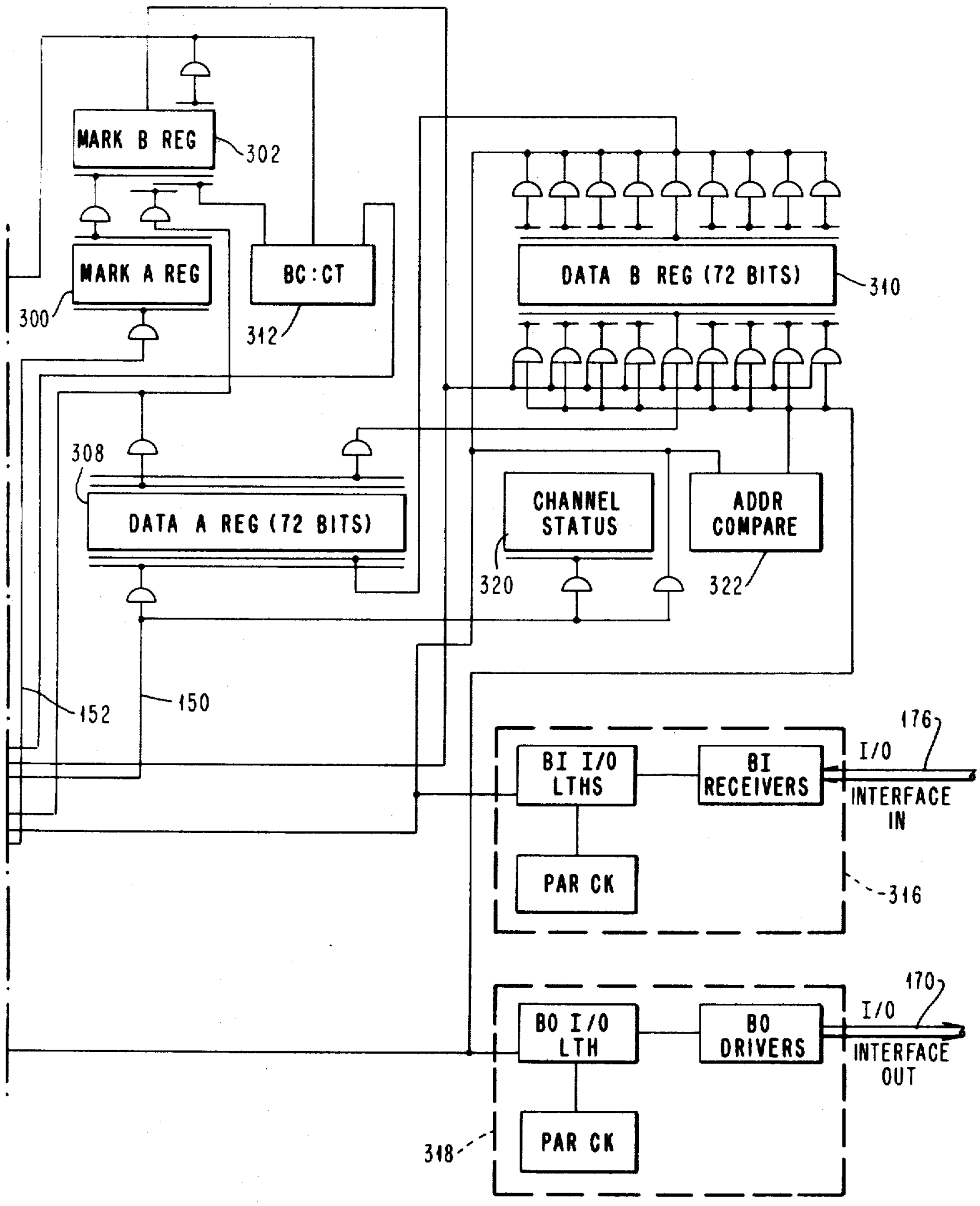
Figure 3:
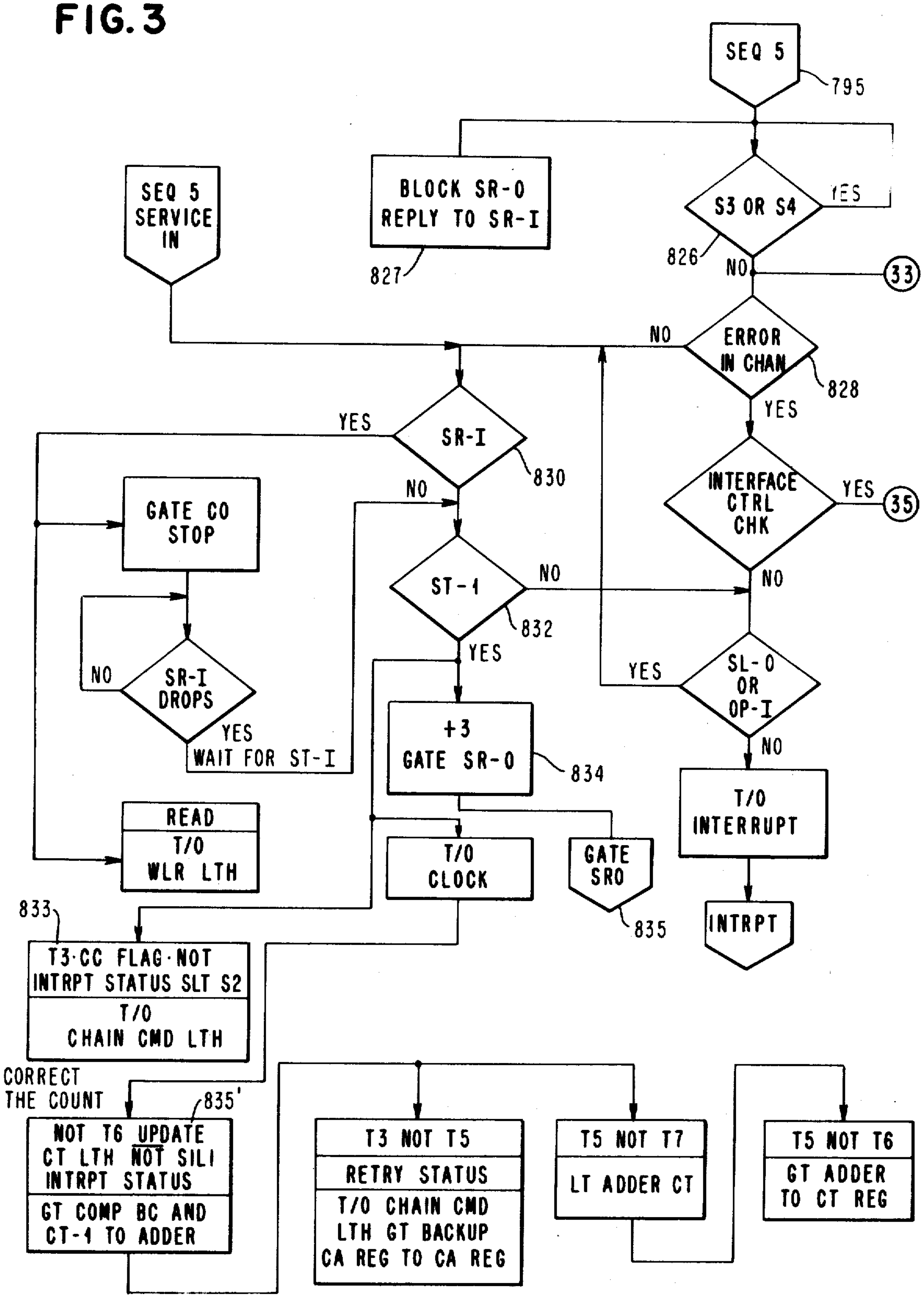
FIG. 3 and FIG. 4 are flow charts describing that portion of the operation of the channel of FIGS. 1A and 1B in which the invention is embodied.
Figure 4:
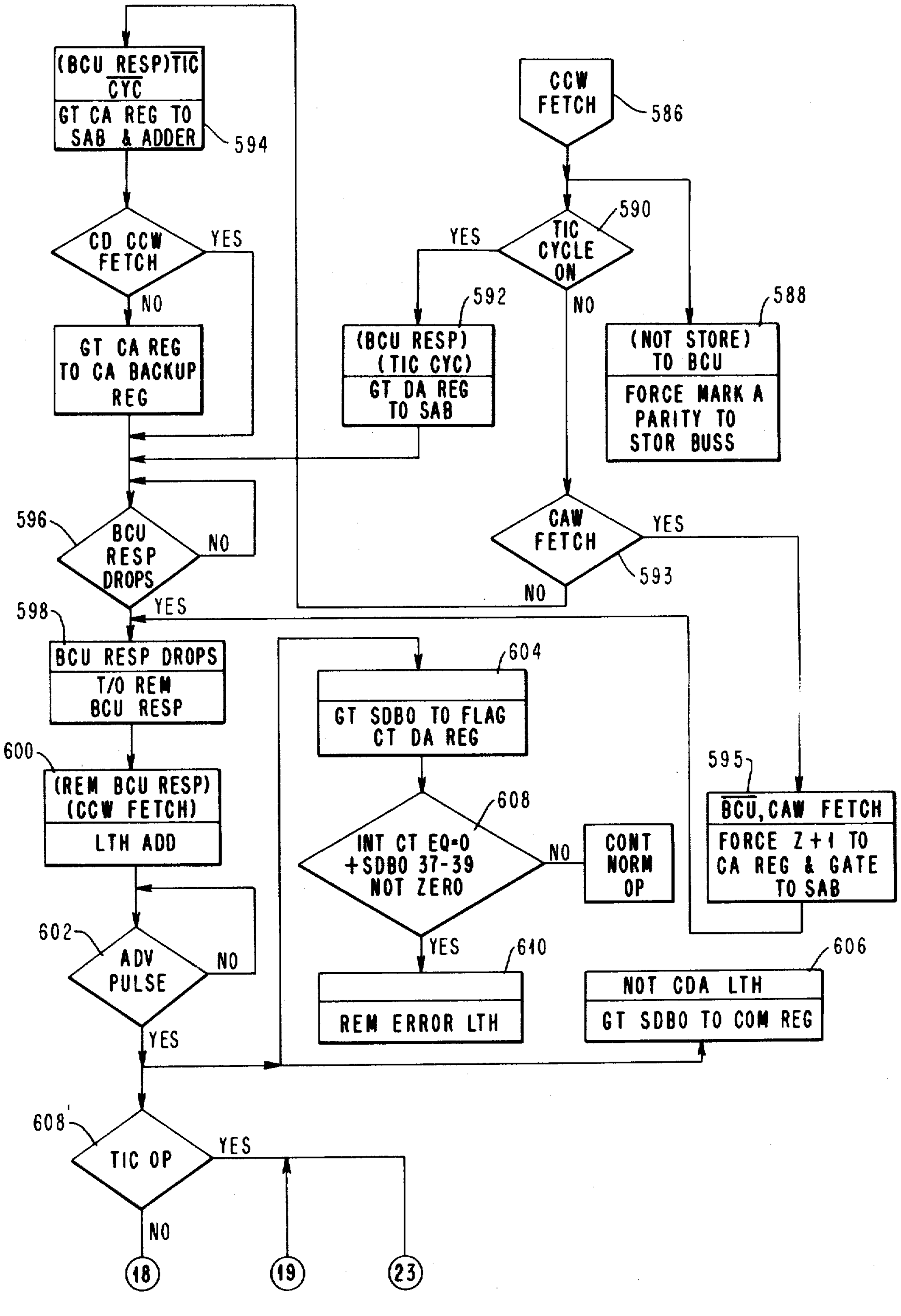

In U.S. Pat. No. 3,488,633 — Automatic Channel Apparatus — filed Apr. 6, 1964 and issued Jan. 6, 1970 to L. E. King et al and assigned to the assignee of the present application, there is disclosed a channel apparatus which disclosure is incorporated herein by reference. FIGS. 1A and 1B are similar to FIGS. 13A and 13B of the King et al patent application but are modified in accordance with the present invention. FIGS. 3 and 4 of the present application are modifications of the data flow of FIGS. 16E and 16S of the King et al application.

With the above type of channel apparatus, an I/O operation is initiated when the central processing unit (CPU) executes an instruction specifying the type of operation, the channel address and the input/output control unit and device to be selected. The channel enters main storage at a designated location and obtains a channel address word (CAW) which, in turn, provides the location in main storage of the first of a series of channel command words (CCWs). Each CCW includes an operation code field, a data address pointing to a location address in main storage, and a count field which indicates the number of data units to be transferred, beginning at that location address. A flag field in the CCW is provided to indicate whether or not chaining of CCWs is required. Two types of chaining can occur, command chaining (CC) and data chaining (CD). Thus, with chaining specified, at the end of the execution of one CCW, a new CCW will be automatically selected from the location in main storage adjacent to the previously executed CCW. In a typical input/output operation, the first CCW of a chain contains a command to read or write data at the device . This command is transmitted to the control unit which controls the device and the control unit transmits data to the channel. The channel stores the data automatically in the main storage at the address pointed to by the location address stored in the CCW. As new units of data are received from the control unit, the location address is incremented until the count portion of the CCW is reduced to zero. This indicates that the total number of data addresses corresponding to this CCW have been exhausted.

Assume the CCW has the flag position energized which causes it to be chained to a subsequent CCW. When the count is exhausted, the data channel acquires the next sequential CCW and continues to transfer data, but now the addresses in main storage are those pointed to by the location address of the new CCW. The location address of the new CCW is incremented sequentially as data units are transferred until the count of the new CCW is reduced to zero. This chaining operation continues until the end of the CCW stream is reached.

A unit control word (UCW) is provided at the channel and contains a pointer by which the data channel determines the main storage address from which to obtain each successive CCW. This pointer is updated after each operation and therefore, if an error occurs in any CCW in the chain, it is not possible to back up to the CCW at the beginning of the chain because that address information no longer exists.

In accordance with the present invention, the address of the last command executed is stored in a command address back up register 203 provided in FIG. 1A. Now when an error condition occurs at the control unit, the channel retries the CCW stream by utilizing the address stored in the command address back up register to fetch the CCW which contained the command at the beginning of the CCW stream.

The control unit issues a retry status signal to the data channel by means of a status byte which is transferred from the control unit to the channel during an initial selection sequence over the I/O interface 170, 176 FIG. 1B. The interface is more fully described in U.S. Pat. No. 3,336,582 — Interlocked Communication System — W. F. Beausoleil et al, filed Sept. 1, 1964, issued Aug. 15, 1967 and assigned to the assignee of the present invention.

Figure 2:
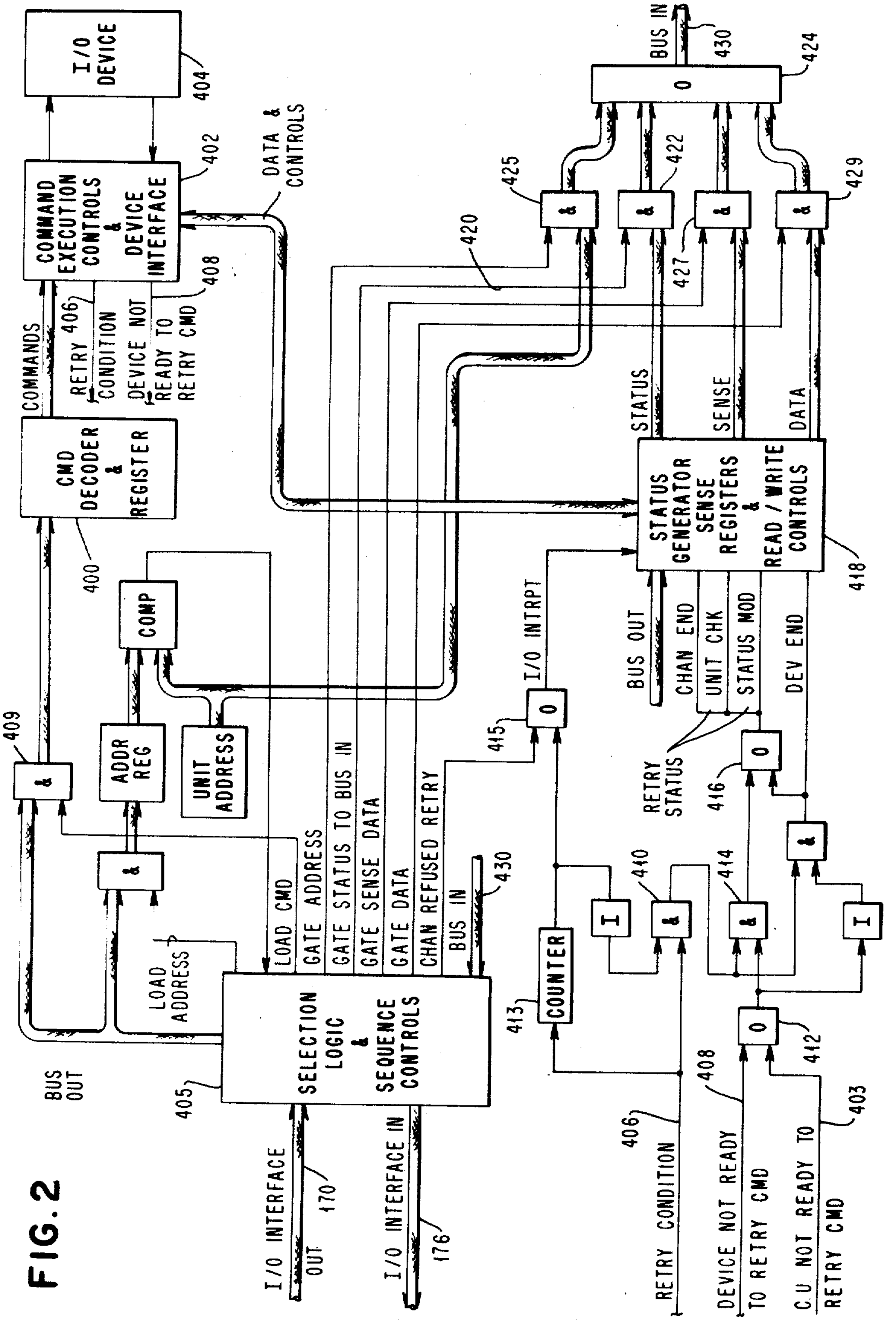
FIG. 2 is a block schematic diagram of a typical control unit in which the invention is embodied and particularly adapted to operate with the channel of FIGS. 1A and 1B.

A typical control unit for use with and incorporating the present invention is shown in FIG. 2. This control is adapted to operate with the input/output interface described above. A complete description of a typical control unit adapted to operate with such an interface is found in U.S. Pat. No. 3,303,476 — Input/Output Control — J. T. Moyer et al, filed Apr. 6, 1964 and issued Sept. 7, 1967 and assigned to the assignee of the present invention.

In the control unit of FIG. 2, commands received from the channel over I/O interface 170 are decoded and executed in accordance with the requirements of the particular I/O device being controlled. Should a condition requiring the retry of a particular command be encountered by the control unit or the device, a retry condition causes bits to be set in the status byte at the control unit. Upon the next initial selection sequence over the input/output interface, this status information is transferred to the channel and the channel notes that the control unit desires the previous command to be retried. The channel then gates the address stored in the command address back up register 203 (FIG. 1A) to the command address register 202 and utilizes this address to fetch a CCW. This CCW corresponds to the CCW which contained the command currently being executed. The channel is then able to back up in the channel program and re-execute the entire sequence of CCWs.

Selector Channel

For purposes of this specification, an operation is defined as encompassing the sequences from the acceptance of a start I/O instruction or similar instruction by the channel to the subsequent I/O interruption signalling the completion of the operation. If a channel program includes several commands in a chain of commands, the entire sequence of commands is defined as one operation.

The channel described in the above identified King et al patent is a selector channel and is capable of having only one operation in progress at any one time and therefore, remains connected to one device for the entire operation. It should be understood that the invention can be practiced on other types of channels such as byte multiplex or block multiplex channels described subsequently.

The programming registers shown in FIGS. 13A and B of the King et al patent have been modified to include a command address back up register 203 shown in FIG. 1A. Gating means are provided to gate the command address back up register 203 to the command address register 202. Further gating means are provided on the output of the command address register 202 so that the contents of that register may be gated to the command address back up register 203. Data address register 200, command register 202, flag register 204, count register 206, storage protection register 208, unit address register 210, and operation register 212 are connected through data paths to the storage. The channel of FIGS. 1A and 1B is also connected to the I/O interface out 170 and the I/O interface in 176. A control unit shown in FIG. 2 is connected to the channel over the I/O interface. The operation of the data flow of the channel is more fully described beginning at column 26 of the King et al patent and will be described herein only to such an extent to provide an understanding of the present invention.

An I/O operation initiated by a start I/O instruction causes the channel to fetch the command address word (CAW), the address portion of which is stored in the command address register 202. The flow chart describing this operation is shown in FIG. 3 and is more fully described with respect to FIG. 16E of the King et al application. Decision block 593 of FIG. 3 has a yes output which causes the channel to gate the contents of the command address register 202 to the storage address bus (SAB) 151. The channel fetches the first channel command word (CCW) and the command address register is incremented by one to provide the address of the next CCW.

Each CCW fetched includes an operation code field, a data address pointing to a location in main storage, and a count field which indicates the number of data units to be transferred beginning at that location address. The operation code is stored in register 212, the data address is stored in register 200 and the count is stored in register 206. A flag field in the CCW is provided to indicate whether or not chaining of CCWs is required. The flag field is stored in the flag register 204. Two types of chaining can occur, command chaining and data chaining indicated by the chain command (CC) and chain data (CD) bits respectively. With chaining specified at the end of the execution of one CCW, a new CCW is automatically selected from the location in main storage adjacent to the previously executed CCW. The address for this next CCW is obtained by incrementing the command address register 202. If the CC bit is on, this indicates that the next CCW contains a command. If the CD bit is on, it indicates that the next CCW does not contain a command and is used only for controlling the data transfer. Thus, in the flow chart of FIG. 3 at block 599, if the CD flag is on the logic gates the command address register 202 to the back up register 203. If the CD bit is off, the operation is command chaining if it is chaining at all and therefore, the command address register is not transferred to the back up register. Thus, the back up register will contain the last command executed in a sequence of CCWs.

Suppose, for example, the first CCW of a chain of CCWs contains a command to read data. This command is stored in the operation part of the CCW and is stored in register 212 of FIG. 1A. Subsequent CCWs contain no command in this portion of the CCW but do contain the necessary information to control the read operation to transfer data to memory locations.

The CCW fetch operation 586 (FIG. 3) proceeds in the normal manner for a selector channel. The CAW fetch decision block 593 decides no and at block 594, the logic gates the command address register to the storage address bus to fetch the CCW. At block 599 a decision is made as to whether the fetched CCW has the chain data bit on. If no, then command chaining is specified and the fetched CCW contains a command. Therefore, this command must be saved. At block 601, the logic gates the command address register 202 (FIG. 1A) to the command back up register 203.

The command is transmitted to the control unit of FIG. 2 over the I/O interface 170. The I/O interface sequences are controlled by the selection logic and sequence controls 405. These controls cause the command to be loaded via AND circuit 409 to the command decoder and register 400. The commands are decoded and transmitted to the command execution controls 402 which control the I/O device 404. The command is executed and data transfer occurs over the I/O interface. As the count portion of the CCW is exhausted, new CCWs are fetched in accordance with the data chaining described in column 49 and 51 of the King et al patent. Should an error occur in the control unit or should some non-error condition occur which requires the retry of the command being executed, the command execution controls raise the retry condition line 406. This causes the AND circuit 410 to be energized. If the device is not ready to immediately retry the command, the controls 402 raise the line 408 which, via OR circuit 412, energizes AND circuit 414. This causes the OR circuit 416 to be energized and causes retry status (unit check and status modifier) along with channel end to be stored in the status registers 418. Upon the next selection of the I/O interface, the selection logic 405 energizes the gate status to bus in line 420 which gates the contents of the status register to bus in by means of AND circuit 422 and OR circuit 424.

The channel responds to status information from a control unit in the manner described with respect to FIG. 16S of the King et al patent. The description of chaining of data addresses for a read command begins on column 51 of the King et al patent. When the status information indicating retry is received by the channel, the channel (block 836 of the flow diagram of FIG. 4) causes the controls to turn on the chain command latch and gates the back up command address register to the command address register 202 of FIG. 1A. Turning on the chain command latch forces the chaining operation which is described at column 50 line 52 of the King et al application. The chaining of command addresses begins with the command latch being set in the CC flag in the CCW. However, for purposes of the retry operation, the chain command latch is set when the retry status bits are interpreted by the channel rather than by the CC flag. The chaining command address sequence begins with sequence 5 shown in FIG. 4. Thus, the channel has backed-up in the chain of operations and begins with the last CCW which contains the command and which had the chained command (CC) bit on.

Block Multiplex Channel

When command chaining is used, there are control units which, after accepting one command, require a relatively long time interval before they are capable of accepting the next command of the chain.

Under these circumstances, in order to make more efficient use of channel facilities, a modification has been introduced into new data channels which allows the channel to release the device during these long time intervals, but still maintain the address of the next command to be executed. When the particular device is ready to continue, it reconnects to the channel and the channel, using the command address it has saved, fetches the next sequential command and continues the operation. During the time interval when the device is disconnected, the channel can be used for other operations. This channel is capable of having several operations in progress at any one time and is called a block multiplex channel.

The normal operation on a block multiplex channel is such that after executing one command, if the device could immediately execute the next command, it presents channel end and device end in the status bits transferred to the channel during an ending sequence over the I/O interface. If a long time delay is anticipated before the second command can be executed, the device sends only channel end status which allows the channel to disconnect from the device. At a later time, in response to a polling sequence by the channel, the device reconnects to the channel, presents device end status and continues the operation where it left off.

By utilizing the present invention on such a block multiplex channel, the channel and control unit can jointly re-execute a command at the beginning of a CCW stream. The channel, during the course of executing a command, maintains the address of that command as well as the address of the next command. The control unit, therefore, on completing one command can signal the channel as to whether it desires to continue with the next command or whether it desires to back up and re-execute the current command. This ability is useful in both error and non-error conditions.

In the case of an error occurring during the execution of one command, the control unit by signalling retry status can cause the channel to refetch the command and, therefore, re-execute it. This allows the channel and the control unit to jointly correct an error condition without creating an I/O interruption to the processor.

The retry capability is also useful in non-error situations to allow a disconnection on the previously described block multiplex channel. The block multiplex channel may send a command to a control unit and by the nature of the command and the status of the control unit, the control unit determines that there is a long time interval before it is capable of executing the command. In this situation, the control unit sends back retry status with channel end turned on in the status bits, but without device end turned off. The channel then allows the control unit to disconnect and the channel goes on to other operations. When the device is ready to execute the command, it reconnects to the channel and presents device end in the status bits which causes the channel to re-execute the original command, the address of which the channel had stored in the unit control word.

Command Retry in Non-Error Situations

It is within the scope of this invention that command retry be utilized in some control units for purposes unrelated to errors. This enhances the performance of the control unit and the device and with channels which allow for disconnection of the device from the channel allows for more efficient use of channel resources.

It is further contemplated that some control units may implement a new command which will control the retry facilities in the control unit. Thus, certain commands, command chains, or command sequences may be made selectively retryable by means of this new command. Such commands are not, however, a requirement of the command retry mechanism and, if provided, are device dependent.

Some tape units are designed with a wide tape in which data are written in a first direction on one portion of the tape from beginning to end and then the data is continued in the opposite direction after the head has been repositioned to a next higher track position laterally across the tape. The command retry mechanism is utilized when executing a read or write command on such a tape unit.

These tape units utilize separate read and write head gaps which are spaced a short distance from each other along the length of the tape. If the tape is read by the read head gap and suddenly the writing operation is switched on, the head function shifts from the read head gap to the write head gap. Thus, there is an effective jump in the head function to a different place on the tape at the instant of switching by the amount of spacing between the read and write heads. A common situation is where a block of data being written is found to have an error by a simultaneous read check by the read head which follows the write head with respect to the direction of tape movement. Consequently, the block must be rewritten and therefore, it is necessary to backspace the tape to the beginning of the block before rewriting can start.

In prior tape devices, where large inter-block gaps exist, as compared to the spacing between the read and write heads, it is certain that the read and write head gaps will be within the inter-block gap at the end of a backspace over a block. However, in new tape systems, a very short inter-block gap exists and there is no assurance that the write head gap is in the inter-block gap even though the read head gap is in the inter-block gap. If writing were to start under these conditions, the initial part of the rewritten block might not be erased or rewritten. Backhitching in tape control units insures that this does not occur. This is more fully described in U.S. Pat. No. 3,274,574 — Backhitching Tape Control — Miller and Irwin, filed Dec. 24, 1962 and issued Sept. 20, 1966, and assigned to the assignee of the present invention.

Briefly, backhitching involves backing the tape up until the read head gap is within the prior block. The tape is then reversed and accelerated in the forward direction while reading the prior block. The write head is switched on when the end of the prior block is sensed by the read head. This insures that the generated inter-block gap is precisely measured from the end of the prior written block.

Figure 5A:
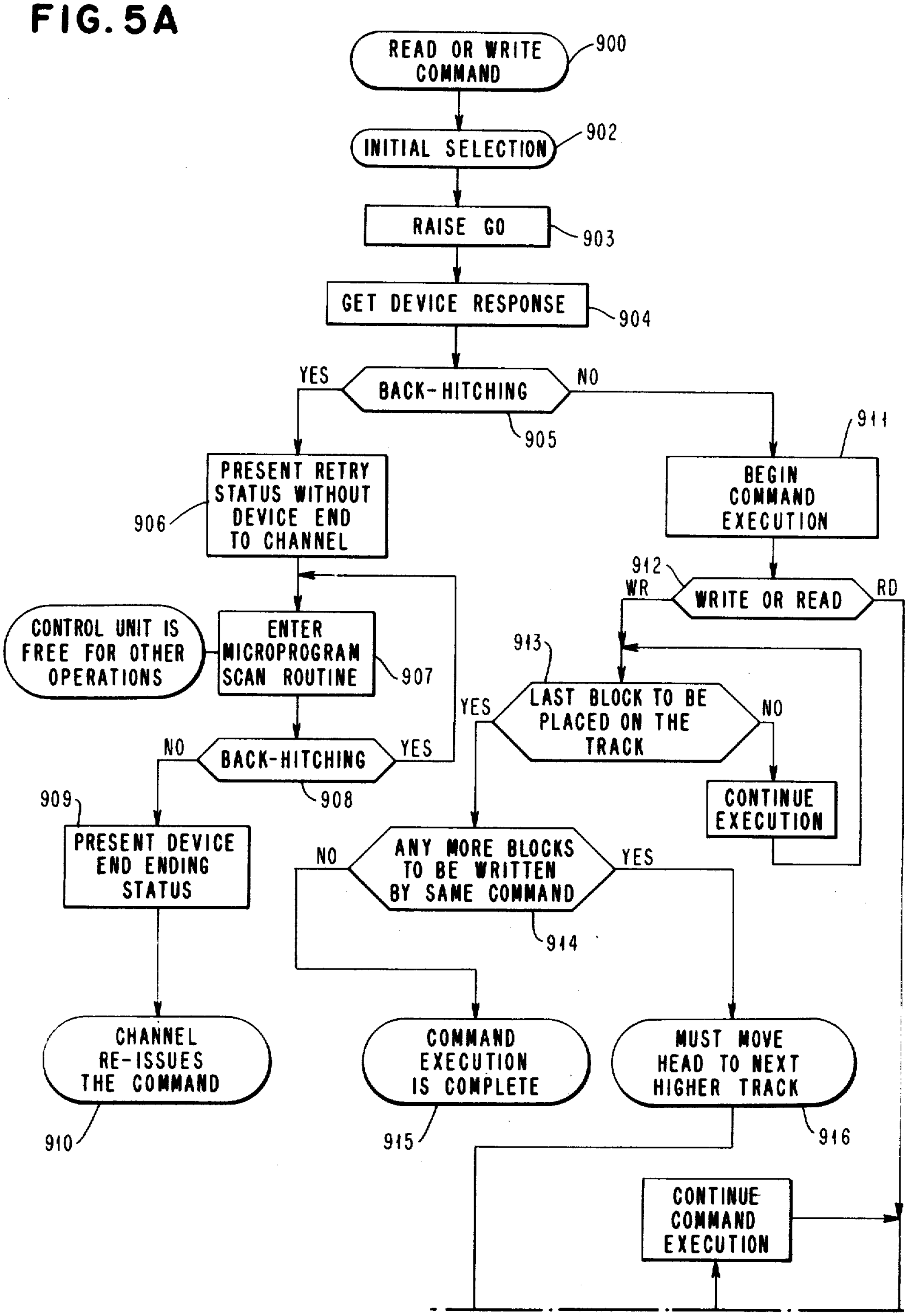
FIGS. 5A and 5B are a flow chart describing the operation of a tape control unit in which the invention is embodied.
Figure 5B:
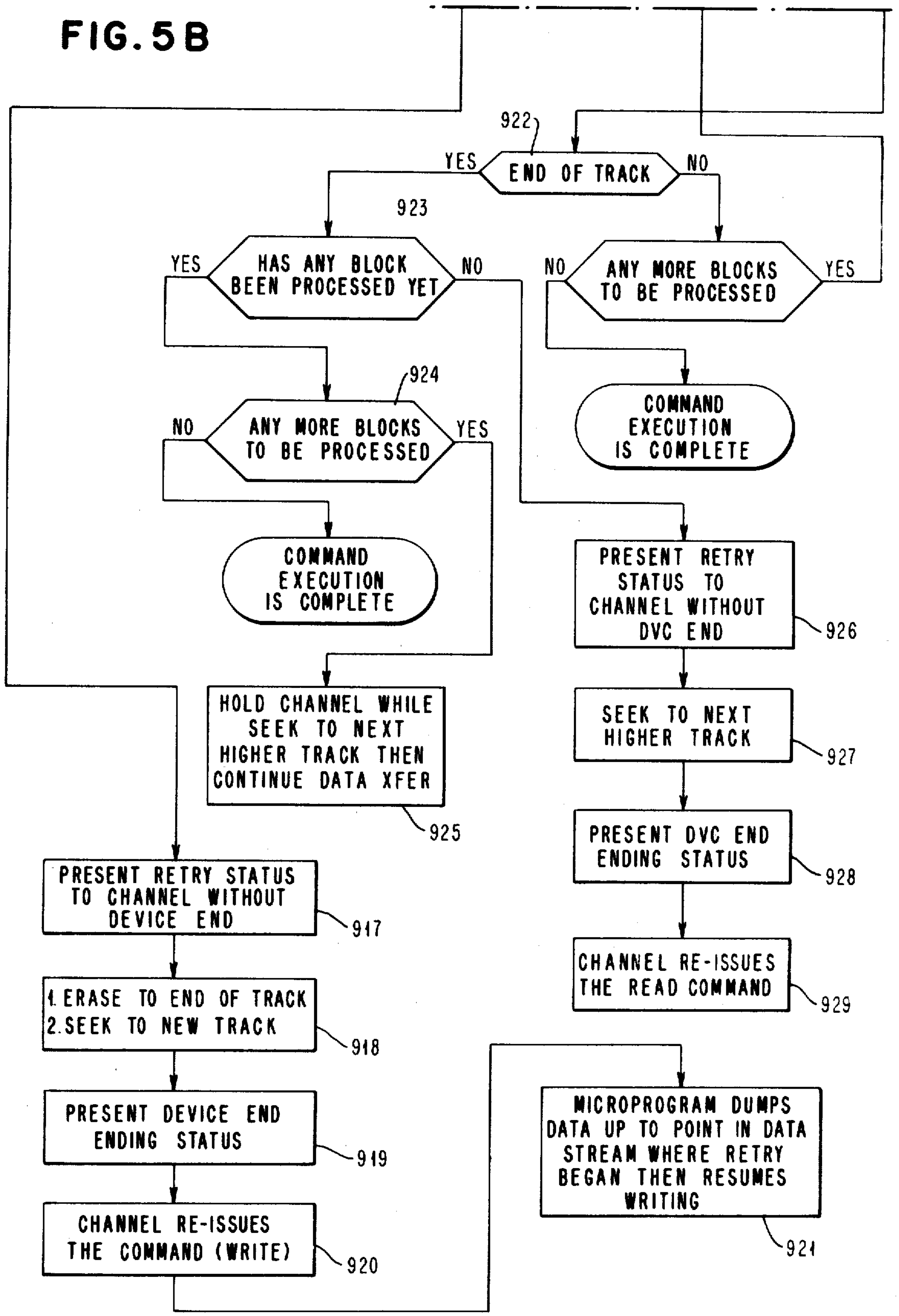

Referring now to the flow chart of FIG. 5 and FIG. 2, the utilization of command retry in such a situation and in other non-error situations is described. 900 — A read or write command is decoded by the command decoder 400 (FIG. 2) at the control unit. 902 — An initial selection takes place which selects the I/O device 404 which in this case is a tape unit. 903 — Raise go causes the tape unit to accelerate up to tape speed. 904 — The device response is received. 905 — A decision is made as to whether backhitching is to take place. If yes, the control unit at 906 presents retry status without device end to the channel. In the logic of FIG. 2, this is accomplished by raising retry condition line 406 with device not ready to retry command line 408.

907 — The control unit enters a microprogram scan routine which causes the control unit to perform the backhitching operation described above. 908 — A decision indicates when the backhitching operation is completed. When completed, the control unit at 909 presents device end during the ending status sequence on the I/O interface. In the logic of FIG. 2, this is accomplished by dropping line 408. At 910 the channel reissues the previous command in accordance with the retry mechanism which has been described.

Re-issuing the command causes the original command to be decoded at 900 and the sequence of operation is repeated. Now when decision 905 is reached, the control unit is no longer backhitching and the control unit begins command execution 911. For a write command, follow the left hand side of decision block 912. At decision block 913, a logical decision as to whether this is the last block to be placed on the track is made. If yes, a further decision is made 914 as to whether any more blocks are to be written by the same command. If no, command execution is complete 915. If yes, the head must be repositioned at 916 to move the head to the next higher track laterally across the tape. This will take some time and therefore, the control unit disconnects from the channel to allow the channel to do other operations until the head has been repositioned. Thus, at 917 the tape unit presents retry status to the channel without device end. The tape unit then at 918 erases to the end of the current track and causes the tape head to seek to a new track. This involves positioning the head laterally across the tape to the new track. When this is complete, then the control unit is ready to retry the command and at 919 presents device end with ending status over the I/O interface. This causes the channel at 920 to reissue the write command. At 921 the microprogram clears the control unit of data bytes written previous to retry and then picks up the writing function when the partially written block of data is encountered.

Returning now to decision block 912, if a read command is decoded, follow the right hand path of the flow chart. At 922, if the end of a track is reached, the head must be repositioned to the next higher track. A decision is made at 923 as to whether any block has been processed yet. If yes, a decision is made at 924 as to whether any more blocks are to be processed. If no, command execution is complete. If yes, the controls in the control unit hold the channel on the I/O interface while the head performs a seek to the next higher track at which point the read data transfer continues.

Returning to decision block 923, if no block has been processed yet, at 926 the control unit presents retry status to the channel without device end. At 927 the control unit seeks to the next higher track and at 928, once this has been completed, the control unit presents device end along with the ending status over the I/O interface. This causes the channel to reissue the read command in accordance with the retry mechanism.

While the invention has been particularly shown and described with reference to a preferred embodiment thereof, it will be understood by those skilled in the art that various changes in form and details may be made therein without departing from the spirit and scope of the invention.

What is claimed is:

1. In a data processing system including a central processing unit; a storage having a series of chained input/output channel command words (CCWs) stored in sequential locations in said storage, the first one of said CCWs containing a coded command; a channel; and an input/output controller responsive to said channel and adapted to perform input/output operations in response to said command, the improvement comprising:

address registering means in said channel for storing an initial address manifestation for initially addressing the first in said series of sequential locations;

means for incrementing said address manifestation by one location address to thereby fetch the next sequential CCW;

retaining means for retaining said initial address manifestation of said first CCW of said series of CCWs; and means operative in response to a signal bearing a predetermined relationship to said input/output controller for fetching the CCW corresponding to the address manifestation retained in said retaining means to thereby retry said series of CCWs beginning with said first CCW.

2. For use with a channel of the type in which input/output operations are carried out in response to channel command words (CCWs) obtained by said channel from a storage, and in which address means in said channel specify the address of a command word in said storage, and in which chaining means are included responsive to the contents of a current command word obtained from said storage at said specified address for incrementing said address means a fixed amount so as to address a next command word upon completion of the function called for by said current command word, and in which means are included for retaining the address of one of said command words; a control unit comprising:

command execution control means responsive to commands from said channel for controlling a device;

means for indicating to said channel that said control unit requires re-execution of one of said commands; and means responsive to testing of the status of said control unit by said channel for presenting to said channel an indication that said control unit is ready to re-execute said one command.

3. A peripheral device controller for operating a peripheral I/O device and adapted to be connected to a controlling device capable of supplying command sequences for effecting operations in the peripheral device, the improvement including in combination:

command execution control means responsive to commands from said controlling device for effecting a peripheral operation including some operations in said peripheral device;

status generating means responsive to signals from said command execution control means indicating the desirability of repeating at least one peripheral operation effected or partially effected by said command execution control means for generating indicia of the status of said peripheral device;

first means responsive to signals from said controlling device to supply said status indicia to said controlling device; and second means operative to inhibit completing command execution and to prepare said peripheral device for receiving from said controlling device a previously received command for repeating said one peripheral operation.

4. In a data processing system including a storage having a series of chained input/output channel command words (CCWs) stored in sequential locations in said storage, at least one of said CCWs containing a coded command, the method comprising the steps of:

storing an initial address manifestation for initially addressing the first in said series of sequential locations;

successively incrementing said address manifestation by one location address to thereby fetch each sequential CCW;

retaining the address manifestation of said one CCW of said series of CCWs, which one CCW contains a coded command; and fetching the CCW corresponding to said address manifestation retained to thereby retry said series of CCWs beginning with said one CCW.

5. For use with a channel of the type in which input/output operations are carried out in response to a list of channel command words (CCWs) obtained by said channel from a storage, and in which address means in said channel specify the address of a CCW in said storage;

said CCWs including a command field and a flag field having a chain command (CC) list and a chain data (CD) list for indicating that a current CCW is chained to a CCW having a command or not having a command therein, respectively; and in which chaining means are included responsive to the flag field of a current CCW obtained from said storage at said specified address for incrementing said address means a fixed amount so as to address a next CCW upon completion of the function called for by said current CCW, and in which means are included for retaining the address of a CCW; a control unit comprising:

command execution control means responsive to commands from said channel for controlling a device, said control means including retry condition means for signalling a condition requiring the re-execution of a command; and status signalling means responsive to said retry condition means for indicating to said channel that said control unit requires re-execution of said command.

6. The combination according to claim 5 wherein said command execution means includes not ready to retry means for signalling that said device is not ready to retry said command upon energization of said not ready to retry means and said status signalling means includes further means responsive to said not ready to retry means for indicating to said channel that the device is not ready to immediately retry the command.

7. The combination according to claim 6 wherein said control unit includes means responsive to said not ready to retry means and responsive to testing of the status of said control unit by said channel for presenting to said channel an indication that it is ready to execute the command upon the de-energization of said not ready to retry means.

8. For use with a data processing system including a central processing unit; a storage having a series of chained input/output channel command words (CCWs) stored in sequential locations in said storage, said CCWs having a command field and a flag field, the first one of said CCWs containing a coded command in said command field; a channel; and an input/output controller responsive to said channel and adapted to perform input/output operations in response to said command, the improvement comprising:

retry means in said channel for retrying said sequence of CCWs starting with the last CCW executed which contains a command in its command field, said retry means rendered operative by a control unit attached to said channel, and means in said flag field of said CCWs which, when in one or the other of two states, selectively inhibits or permits said control unit to render said retry means operative.

* * * * *